A. G. DAVIS.
Galvanic Batteries.
No. 134,364.
Patented Dec. 31, 1872.
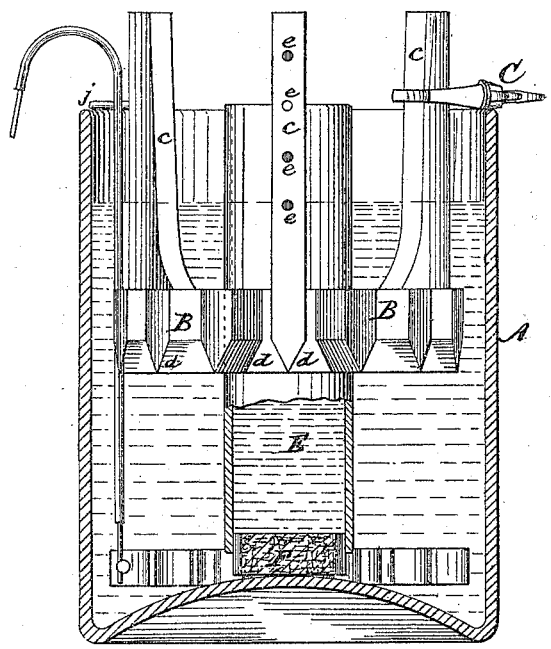
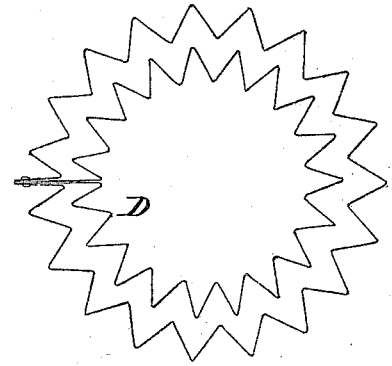
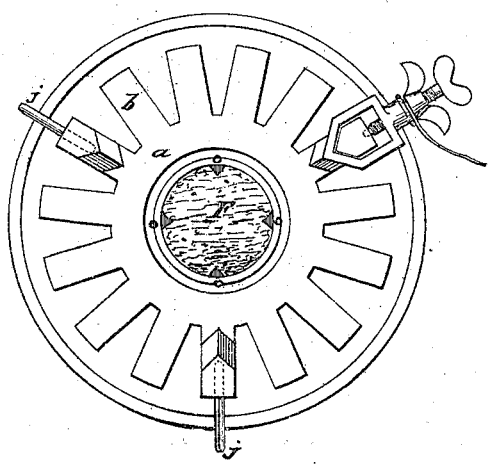
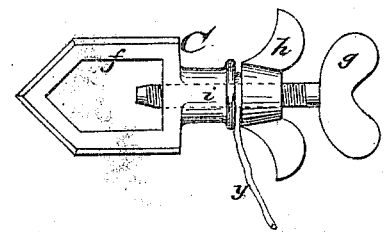
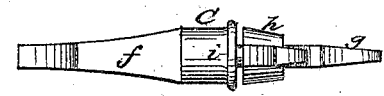
Witnesses:
T. C. Brecht
O. E. Duff
Inventor:
A. G. Davis
by
Fred W. Royce
Attorney

UNITED STATES PATENT OFFICE.

AUGUSTUS G. DAVIS, OF BALTIMORE, MARYLAND.

IMPROVEMENT IN GALVANIC BATTERIES.

Specification forming part of Letters Patent No. 134,364, dated December 31, 1872.

*To all whom it may concern:*

Be it known that I, AUGUSTUS G. DAVIS, of the city and county of Baltimore and State of Maryland, have invented certain new and useful Improvements in Galvanic Batteries, of which the following specification is such a full and clear description as will enable others to make and use the same, reference being had to the accompanying drawing forming part of this specification, in which—

Figure 1 is a vertical sectional view of a battery embodying my improvements; Fig. 2 is a top view thereof; Fig. 3, side and plan views of the copper or negative element; and Figs. 4 and 5, plan and side views of a combined binding-screw, and used with the zinc or positive element.

My invention relates to that class of batteries known as "gravity batteries," so called from the fact that a porous cup is dispensed with, and the separation of the two exciting liquids used is effected by the difference in their specific gravities.

As is well known, the activity of batteries depends largely upon the amount of surface exposed to chemical action. In ordinary batteries, where the line of demarkation between the different exciting fluids is the porous cup or division, extending vertically, this surface is obtained in a cylinder or plate; but in batteries of this kind, where the line of separation is horizontal, decreasing the vertical depth of each liquid, while the cross-section remains unaltered, a different arrangement is required in order to obtain any large amount of surface. This surface I have obtained by the arrangement of the zinc, as hereinafter set forth, which constitutes one feature of my invention.

It has been usual in batteries of this class to make the negative element of a plain piece of sheet-copper lying flat upon the bottom of the cylinder. The objection to this is that the undissolved sulphate of copper, which it is necessary to have in the battery, lies upon such copper plate, and, partially covering it, practically lessens its effective surface. This difficulty also exists where the copper is simply wound in an ordinary spiral. This I remedy by making this element of two concentric corrugated or stellar-shaped copper strips, connected and set on edge in the bottom of the cell, a central area being left, in which rests the bottom of the feeding-tube; and also by the use of a peculiar feeding-reservoir, which forms additional features of my invention.

In a gravity battery absolute repose is necessary to successful working. Agitation tends to overcome the force of gravity and mix the liquids. A small commingling materially weakens the action of the battery, while any considerable amount totally destroys it. In the ordinary methods of feeding in the sulphate of copper, either by dropping it directly into the cell or into a central feeding-tube open at the lower end, a certain amount of jar and agitation is induced. This I obviate by using a central feeding-reservoir, open at the upper end, but closed at the lower end by a perforated cork. This cork rests upon the bottom of the cell, and any jar received by it from the dropping of crystals into the tube is not communicated to the mass of the liquid, while the sulphate solution made therein finds its way out through the perforations. This forms an important feature of invention in my improved battery.

In suspending the zinc or positive element it has been found necessary to have some means of adjusting its vertical position in order that as the height of the copper solution varies the zinc may be elevated or depressed, so that it is always immersed in its solution and at the proper distance from the line between the two solutions. This has been accomplished by a central rod attached to the zinc passing up through a bar, in which it is held by a thumb-screw or other device; but the difficulty with such a device is that with it no central feeding reservoir or tube can be used, and, there being only one point of support to the zinc, there is a greater probability of its falling and breaking the cell than when more points of support are provided. I provide my zinc with two or more (preferably three) vertical arms, projecting upwardly from the projections upon its outer rim and equidistant from each other. These arms are perforated at suitable distances, and pegs insertert therein, which pegs rest upon the upper edge of the glass cell. For one of the arms I provide a combined supporting-clamp and binding-screw. These form the remaining features of my invention, and by their use the power of adjustability is greatly increased, while the danger of the zinc falling and destroying the battery is reduced to a minimum.

Referring to the drawing for a more particular description, A is a cell or jar of ordinary construction, within which is suspended the zinc B. This zinc is cog-wheel shaped, having the ring from which project the cogs $b$, which are beveled upon their under edge, as shown at $d$. This zinc is provided with two or more (preferably three) standards, C C C, rising from the outer edge of certain of the cogs equidistant from each other. These standards are for the purpose of supporting the zinc in the cell at any desired height by means of pins inserted in holes $e\ e$ of the standards, and by means of the clamp $c$ on one of them. The copper element rests upon the bottom of the cell on its edge, and is composed of two concentric corrugated or stellar strips, as shown in Fig. 3. The insulated wire $x$ is connected thereto, and extends up through and out of the cell, down through the central aperture of the ring $a$ of the zinc. The reservoir E extends its lower end, resting on the bottom of the cell. This reservoir is an ordinary glass tube, the ordinary chimney for an Argand burner answering well for the purpose. Its upper end remains open, while in the lower end is inserted a cork, F, having recesses $o\ o$ cut in its edge. Attached to one of the standards of the zinc is the combined support and binding screw G, consisting of the frame $f$, constructed to fit loosely over the standard, and provided with a neck, $i$, through which works the thumb-screw $g$. The inner end of the screw is somewhat beveled, so that it can be forced by properly turning into one of the holes $e$, when the frame is held firmly to the standard and the zinc supported by the neck $i$ resting upon the edge of the cell. Upon the shank of the thumb-screw $g$ is fitted the winged nut $h$, working thereon and forming the neck $i$, a binding-screw for the wire Y leading from the zinc.

The effects and operation of these devices having been fully set forth in my general statement of the invention, and the invention having been clearly described, what I claim, and desire to secure by Letters Patent, is—

1. The peculiar positive element herein described, having the ring $a$ and projections $b$ with beveled edges $d$.

2. In combination with the subject-matter of the above claim, the supporting and adjusting arms C, substantially as herein described.

3. The negative element, composed of the concentric corrugated or stellar-shaped strips, substantially as herein described.

4. The combination, with the feeding reservoir or tube E, of the perforated cork F, substantially as described.

5. The combined supporting-clamp and binding-screw, consisting of the frame $f$, shank $i$, thumb-screw $g$, and winged nut $h$, substantially as herein described.

A. G. DAVIS.

Witnesses:
H. CRAIG,
C. W. CLARVOE.